US012518722B2

(12) United States Patent
Popp (10) Patent No.: US 12,518,722 B2
(45) Date of Patent: Jan. 6, 2026

(54) BACKGROUND DISPLAY DEVICE

(71) Applicant: Arnold & Richter Cine Technik GmbH & Co. Betriebs KG, Munich (DE)

(72) Inventor: Hermann Popp, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 427 days.

(21) Appl. No.: 17/963,338

(22) Filed: Oct. 11, 2022

(65) Prior Publication Data

US 2023/0114419 A1    Apr. 13, 2023

(30) Foreign Application Priority Data

Oct. 11, 2021 (DE) .......................... 102021126315.8

(51) Int. Cl.
  *H04N 5/232* (2006.01)
  *G02B 3/14* (2006.01)
  *G02B 26/00* (2006.01)
  *G03B 15/10* (2021.01)
  *G06F 3/147* (2006.01)
  (Continued)

(52) U.S. Cl.
  CPC ............... *G09G 5/18* (2013.01); *G02B 3/14* (2013.01); *G02B 26/004* (2013.01); *G03B 15/10* (2013.01); *G06F 3/147* (2013.01); *H04N 5/76* (2013.01)

(58) Field of Classification Search
  CPC ... H04N 5/76; G09G 5/18; G02B 3/14; G02B 26/004; G03B 15/10; G06F 3/147
  USPC ....................................................... 348/801
  See application file for complete search history.

(56) References Cited

U.S. PATENT DOCUMENTS 6,014,259  A     1/2000  Wohlstadter
7,889,425  B1 *  2/2011  Connor .................. G02B 30/54
                                                             359/464
10,616,562 B2    4/2020  Schubert et al.
(Continued)

FOREIGN PATENT DOCUMENTS

GB       2556909 A      6/2018
JP     2020166168 A    10/2020
WO   2020097212 A1     5/2020

OTHER PUBLICATIONS

Zhou Zhong et al: "Light field projection for lighting reproduction", 2015 IEEE Virtual Reality (VR), IEEE, Mar. 23, 2015, pp. 135-142, XP033208932, DOI: 10.1109/VR.2015.7223335 (found on Aug. 25, 2015).

(Continued)

*Primary Examiner* — Trang U Tran
(74) *Attorney, Agent, or Firm* — Amster, Rothstein & Ebenstein LLP (57) ABSTRACT

A background display device for a virtual image recording studio is configured to display, behind a real subject, a representation of a virtual background for a camera recording and comprises an active illumination apparatus that comprises at least one panel having a plurality of picture elements in an at least two-dimensional arrangement; a control device; and a controllable lens arrangement. The control device is configured to control the active illumination apparatus to display the representation of the virtual background, and is configured to change a beam characteristic of at least some of the plurality of picture elements by controlling the lens arrangement.

18 Claims, 6 Drawing Sheets

(51) Int. Cl.
    *G09G 5/18* (2006.01)
    *H04N 5/76* (2006.01)

(56) References Cited

U.S. PATENT DOCUMENTS

2016/0203744 A1* 7/2016 Duffy ..................... G09G 3/003
                                                          345/6
2020/0145644 A1* 5/2020 Cordes ................. H04N 5/2224

OTHER PUBLICATIONS

Anonymous: "The DARK BAYVirtual Production Stage was built to provide film and television series productions with a", ARRI, Jun. 10, 2021, pp. 1-10, XP055974820 (found in the internet: URL: https://www.arri.com/news-en/arri-supported-the-creation-of-the-dark-bay-virtual-production-stage (found on Oct. 26, 2022).

European Patent Office Search Report issued in Application No. EP 22200045.7, dated Feb. 17, 2023.

Article: ARRI supported the creation of the Dark Bay Virtual Production Stage; Oct. 6, 2021, URL: https://www.arri.com/news-en/arri-supported-the-creation-of-the-dark-bay-virtual-production-stage, stored in https://www.archive.org on Oct. 6, 2021.

European German Patent Communication issued in Application No. 10 2021 126 315.8, dated May 13, 2022.

* cited by examiner

BACKGROUND DISPLAY DEVICE

The invention relates to a background display device for a virtual image recording studio that is configured to display, behind a real subject, a representation of a virtual background for a camera recording.

Such background display devices can in particular be provided to display in an image recording studio a landscape or an environment in which a recording is to be made by an associated camera and which forms a virtual background for a scene to be recorded. The image recording studio, for example, can be a film studio for recording moving image sequences or a photo studio in which individual images or still images are recorded. In general, such a recording can include local storage of image data or a transmission to a remote location (e.g. Broadcast, Streaming). In the virtual image recording studio, a virtual background or a virtual environment can thus be created in which an actor can move around during a moving image recording, or it can form a background for a still image recording. The virtual background mentioned in the present context can in particular represent a background subject whose representation can be directly recorded by an associated camera as an apparently real environment of a (foreground) scene. The representation of the virtual background "behind" a real subject is to be understood comprehensively in this context since the virtual environment can also be provided above or below the real subject.

For example, when recording moving images, a background display device can be used to display a representation of a virtual background to be able to record a scene directly in the intended environment. In particular, as a result of this, the acting can be facilitated since possible events occurring in the virtual background can be perceived by an actor and the actor can react to these events. In contrast to the use of a green screen for example where the environment is not visible to the actor, the actor can therefore adapt his acting to any background events and a director, a camera person or any other person involved in a shooting can already gain an overall impression of the scene during the shooting and can evaluate the scene. In addition, the entire scene or a corresponding section of a film can be viewed and checked directly after the recording, without the background provided for the scene also having to be superposed.

In the case of still image recordings, such a background display device can, for example, be used to record photographs in basically any surrounding in an image recording studio, and thus in a controllable environment, and to have the resulting image fully in view while taking the photograph. The background and the real subject or a person to be photographed can thus be optimally matched or coordinated with one another. In addition, the recorded photo can be viewed immediately, in order to carry out necessary adjustments if required.

To display the representation of the virtual background, background display devices can in particular form or have an electronic display, which has an active pixel matrix, and can, for example, comprise an active illumination apparatus having a plurality of picture elements. For example, to display a representation of a virtual background in a virtual image recording studio, an LED wall can be used whose light-emitting diodes can be controllable individually and/or in groups of adjacent light-emitting diodes or in arrays of light-emitting diodes. Light-emitting diodes of such an LED wall can, for example, be provided as LEDs (Light Emitting Diodes) or as OLEDs (Organic Light Emitting Diodes). Furthermore, the light-emitting diodes can be part of a liquid crystal display. Such background display devices can, for example, extend over a width of at least 5 m and a height of at least 2 m to be able to record several actors in front of a common (virtual) background.

Furthermore, background display devices can comprise a plurality of panels at which the picture elements are arranged and which together form the LED wall. While the panels can be substantially two-dimensional and the picture elements arranged at a panel can extend in a two-dimensional arrangement, it can, for example, be achieved by a suitable arrangement of a plurality of panels that the background display device is sectionally curved and/or arched. The background display device can thereby be arranged, for example, both behind and above or below the real subject in the virtual image recording studio in order also to enable the direct recording of a representation of a virtual sky, or of a virtual ceiling of a room, or of a virtual floor in the image recording studio. Alternatively to an LED wall, a representation of a virtual background can generally also be generated by light spots that are produced by a reflection or a transmission at a light source wall, for example, a screen for a rear projection. For this purpose, the active light generation can take place by a projector, wherein the light sources are merely formed indirectly on the screen.

Such a background display device can in particular make it possible to visually present a virtual background, which can in particular represent a three-dimensional scene, by appropriately controlling the picture elements and/or to adapt said virtual background by changing the control during a recording. A background display device thus offers the possibility of representing a virtual background for a scene to be recorded in an animated and easily adaptable manner and thereby, in particular, of facilitating the acting or the gestures.

Whereas, by controlling the picture elements of such a background display device, generally any representation of a virtual background and, for example, also a changing representation of a virtual background can thus be displayed in the virtual image recording studio directly for a recording by an associated camera, a beam characteristic of the light emitted by the picture elements and thus by the background display device is usually fixed and can essentially be predefined by the design of the background display device and a respective type of the picture elements arranged thereat. However, the design freedom is hereby restricted with regard to the display of representations of virtual backgrounds in a virtual image recording studio since the beam characteristic can, for example, not be adapted to different recording situations. Accordingly, when such background display devices are used, the problem can also arise that certain background display devices are not suitable, or are at least not ideally suitable, for certain recording situations and/or that complex subsequent processing procedures of the recorded image material are required.

It is therefore an object of the invention to provide a background display device by which a representation of a virtual background can be displayed with a variable and/or settable beam characteristic.

This object is satisfied by a background display device having the features of claim 1.

The background display device has an active illumination apparatus that comprises at least one panel having a plurality of picture elements in an at least two-dimensional arrangement. The background display device further comprises a control device and a controllable lens arrangement, wherein the control device is configured to control the active illumination apparatus to display the representation of the virtual background. Furthermore, the control device is configured to change a beam characteristic of at least some of the plurality of picture elements by controlling the lens arrangement.

The background display device thus firstly has a control device by which the active illumination apparatus can be controlled to display the representation of the virtual background in the virtual image recording studio for a camera recording and to be able to generate a direct image of the representation of the virtual background by an associated camera. The representation of the virtual background and/or the virtual background can thereby in particular be included as a background in an image generated by the associated camera in order, for example, to form an environment for a scene or a motion picture sequence that is recorded in the virtual image recording studio. Such a background therefore in particular does not have to be subsequently added to the image generated by the camera.

Since the background display device furthermore has a lens arrangement that can likewise be controlled by the control device, a beam characteristic of at least some (in particular of all) of the plurality of picture elements can furthermore be changed and/or adapted. For example, provision can be made that the control device is configured to expand and/or to focus light emitted by at least some of the picture elements by controlling the lens arrangement in order thereby, for example, to achieve an overall expanded beam characteristic of the light emitted by the background display device and/or a focused light emission by the background display device or by sections of the background display device.

For example, in certain recording situations, provision can also be made to use the background display device to illuminate the real subject by, for example, displaying the representation of the virtual background at certain sections or panels of the background display device, while other sections or panels of the background display device are used to emit an illumination light. Such an illumination can in particular take place in addition to other illumination, for example by spotlights, of the virtual background. A division of individual sections and/or panels into sections provided for displaying the reproduction and sections provided for illumination can, for example, be fixed, but can in particular be variably adapted, for instance, in dependence on an orientation and/or position of the associated camera. Due to an appropriate control of the lens arrangement, a beam characteristic of the respective picture elements can in particular also be influenced in such illumination situations in order, for instance, to enable a focused illumination in the sense of a spotlight onto the real subject or as uniform as possible an illumination of the image recording studio.

The lens arrangement can, for example, comprise a plurality of lenses that are associated with a respective one of the plurality of picture elements and/or a group of picture elements to influence the beam characteristic of the respective picture element by way of the lens. By controlling the lens arrangement, in particular optical properties of such lenses can be influenceable in order, for example, to be able to set a desired expansion of a light beam emitted by the respective picture element and/or the group of picture elements. Provision can also be made that, by controlling the lens arrangement, a respective lens and/or the lens arrangement can be selectively positionable above a picture element or above the picture elements or can be removable from the light path of the light emitted by the picture element or the picture elements to selectively enable an influencing of the light emitted by the picture element by the lens or to enable an uninfluenced light emission.

The plurality of picture elements can in particular furthermore be arranged in a regular grid in the at least two-dimensional arrangement, wherein the lens arrangement can be adapted to this grid and can, for example, comprise a lens, which is associated with the respective picture element, at at least some positions of this grid. The lens arrangement can in particular be arranged above the picture elements with respect to a light emission emanating from the picture elements and can, for example, be held in a frame above the at least one panel to be able to influence the light emitted by the picture elements by the lens arrangement.

To be able to display as high-resolution as possible a representation of the virtual background on the background display device, the picture elements can furthermore in particular be formed by light sources having only a small extent to be able to arrange as many picture elements as possible close to one another at the at least one panel. For example, the picture elements can comprise light-emitting diodes, in particular LEDs (light emitting diodes) or organic light emitting diodes (OLEDs), for this purpose. To make an influencing of the beam characteristic of such picture elements of a small dimension possible, the lens arrangement can in particular comprise a plurality of microlenses, wherein a respective microlens can be associated with a respective picture element to be able to intentionally influence the beam characteristic of said respective picture element. Provision can, however, also be made that the lens arrangement comprises lenses having a larger extent relative to the picture elements in order, with a respective lens, to jointly influence the beam characteristic of a plurality of picture elements.

Further embodiments can be seen from the claims, from the description and from the Figures.

In some embodiments, the background display device can be configured as an LED wall and the picture elements can be configured as light-emitting diodes or light-emitting diode units. The light-emitting diodes of such an LED wall can, for example, be configured as LEDs (Light Emitting Diodes) or as organic light-emitting diodes or OLEDs (Organic Light Emitting Diodes). Furthermore, in the case of an LED wall, provision can be made that the individual picture elements, which together generate the representation of the virtual background, are formed by individual light-emitting diodes. However, the individual picture elements can also be formed by respective light-emitting diode units, wherein each light-emitting diode unit can in particular comprise a plurality of light-emitting diodes (in particular two, three, four, five or six light-emitting diodes). The plurality of light-emitting diodes of a light-emitting diode unit can in particular have different emission spectra and can optionally be equipped with a color mixer. Furthermore, in such a light-emitting diode unit, provision can be made that the individual light-emitting diodes of the light-emitting diode unit can be selectively controlled to produce a desired color of the picture element formed by the light-emitting diode unit. A light-emitting diode unit can in particular comprise a light-emitting diode emitting red light, a light-emitting diode emitting green light, and a light-emitting diode emitting blue light.

In some embodiments, provision can further be made that the picture elements can be individually controlled to generate the representation of the virtual background. By controlling the picture elements, a respective color and/or brightness of the picture element can in particular be settable to be able to set a section or a point of the representation of the virtual background that is displayed by the respective picture element to the intended color and/or brightness.

In some embodiments, the background display device can extend in a vertical and/or horizontal orientation, in particular with continuous or quasi-continuous transitions. For example, provision can be made that the background display device extends in a vertical orientation in a planar manner behind the real subject to display the representation of the virtual background behind the real subject. Alternatively or additionally, provision can, however, also be made that the background display device at least sectionally extends in a horizontal orientation so that the representation of the virtual background can also be displayed above the real subject, for example. Furthermore, the background display device can be configured to surround and to cover the real subject in order to enable as complete as possible a display of the virtual background over a large angular range. In a section in which the background display device transitions from a vertical orientation into a horizontal orientation, the background display device can also be arched and/or curved. In particular in an assembly of the background display device from a plurality of panels, the panels can be assembled to form different and, for example, vault-like geometries in order to provide a desired environment for a recording in the virtual image recording studio. Furthermore, in some embodiments, provision can be made that the background display device is sectionally arranged on a floor of the virtual image recording studio. In such sections, the background display device can also in particular extend in a horizontal orientation.

In some embodiments, the background display device can further be configured to illuminate the real subject. The background display device can in particular serve to illuminate the real subject in addition to other illumination of the virtual image recording studio. For example, it can thereby be achieved that the real subject casts a shadow to be expected when illumination sources, for example a street lamp, are included in the virtual background in that the illumination of the real subject to be expected from a real street lamp starts from the displayed representation of the street lamp of the virtual background. However, the background display device can also be configured to sectionally emit light for illuminating a scene and can so-to-say act as a spotlight, while the background display device can display the representation of the virtual background at other sections.

In some embodiments, the background display device can be configured to vary the representation of the virtual background in time during the camera recording. Events taking place in the virtual background can thereby in particular be displayed directly by the background display device during a camera recording so that, unlike, for example, in the case of a green screen recording, an actor can react to these events and can correspondingly adapt the acting thereto.

Consequently, the background display device can in particular be configured to display a film sequence, which can be imaged directly by the camera and, for example, as a background of a moving image sequence. A subsequent superposition of the recording of the camera with a provided background is thus no longer necessary.

Furthermore, in some embodiments, the active illumination apparatus can have a width of at least 5 m and a height of at least 2 m. The active illumination apparatus and/or the background display device can thereby in particular have a sufficient size to be able to record several actors in front of a common (virtual) background. Furthermore, such a sufficient size of the active illumination apparatus can, for example, make it possible to position various real objects, such as furniture and/or seating, in the virtual image recording studio and, for example, to record a film scene involving these real objects and/or with moving actors in front of the representation of the virtual background. The representation of the virtual background and/or the background display device or the active illumination apparatus can in particular extend beyond a section imaged by the camera during a typical recording in the virtual image recording studio, for example a recording of a scene performed by actors, so that the representation of the virtual background can, for example, extend in the image generated by the camera up to all the edges of the image and is not limited to an inner section of the image.

In some embodiments, the background display device can be at least sectionally curved and/or arched. The background display device can in particular be configured to be arranged surrounding the real subject in the virtual image recording studio in order, for example, to enable a recording of the representation of the virtual background in different camera orientations and/or positions. Thus, provision can, for example, be made that the background display device is arranged in a circular arc shape and in a vertical extent to enable a continuous camera recording of the virtual background for camera orientations in a range of, for example, 180 degrees and/or during a pan shot. Furthermore, the background display device can be configured to be arranged arching over a real subject, for instance an actor, in order, for example, to also be able to display a room ceiling or a sky of the virtual background and to be able to image it above the real subject by the camera.

In some embodiments, the virtual background can represent a three-dimensional scene. For example, the virtual background can be a landscape or a room in which a scene to be recorded in the virtual image recording studio is set. The representation of the virtual background displayed on the background display device and/or a section of the representation of the virtual background displayed at the at least one panel can in particular correspond to a projection of the three-dimensional scene or of a section of the three-dimensional scene onto the two-dimensional arrangement of the picture elements.

In some embodiments, the control device can be configured to control the picture elements of the panel individually and/or in groups of adjacent picture elements to display the representation of the virtual background. For example, the control device can be directly connected to the picture elements of the at least one panel to individually control the picture elements to display respective image information that can, for example, correspond to a brightness and/or a color value of a pixel of the representation of the virtual background to be displayed by the picture element. However, provision can also be made that the control device is configured to transmit one or more pieces of image information for a group of adjacent picture elements that can be displayed by the picture elements. For example, the control device can be connected to a driver and/or a driver chip for this purpose, wherein the driver and/or the driver chip can be configured to individually control the picture elements of a respective group of picture elements. In this regard, the control device can in particular be configured to transmit respective image information for the picture elements of a group of picture elements to such a driver and/or driver chip, wherein the driver and/or the driver chip can be configured to distribute the respective image information to the picture elements and to individually control the picture elements to display respective image information.

In some embodiments, the control device can comprise a microcontroller, a microprocessor and/or a CPU (central processing unit). Furthermore, the control device can, for example, comprise a plurality of microcontrollers or microprocessors, wherein the control of the picture elements to display the representation of the virtual background can, for example, take place via one of the plurality of microcontrollers or microprocessors, while another one of the plurality of microcontrollers or microprocessors can be configured to control the lens arrangement. In such an embodiment with a plurality of microcontrollers or microprocessors, a communication can, however, be provided between the microcontrollers or microprocessors in order, for instance, to be able to perform the control of the lens arrangement in dependence on a control of the picture elements. However, provision can also be made that the control device comprises a single microcontroller, microprocessor and/or a single CPU via which both the picture elements and the lens arrangement can be controlled. Furthermore, the control device can be formed by a single physical unit or distributed to a plurality of physical units that are separate from one another, but that are in particular connected to one another in a technical signal manner.

In some embodiments, the control device can be configured to electrically control the lens arrangement. For example, the lens arrangement can be controllable by an electrical signal to change positions and/or orientations and/or shapes of at least one lens that is arranged above at least one picture element in order thereby to adapt the beam characteristic of the at least one picture element.

Furthermore, the lens arrangement can in particular be controllable by applying an electrical field. For example, the lens arrangement can comprise a plurality of microlenses, wherein such microlenses can in particular be adjustable by small electrical voltages. This can make it possible to adapt the settings of the microlenses, for example a focal length and/or a focal value of a lens, by an only slight change of the applied electrical field and/or of the electrical voltage, and thus quickly, in order to be able to flexibly change the settings during a recording in the virtual image recording studio. The lens arrangement can in particular be controllable within a few milliseconds, for example within 10 milliseconds or within milliseconds, so that an image-synchronous control of the lens arrangement can be performed, if necessary. Thus, for instance on a display of time-varying representations of the virtual background, the lens arrangement can be individually controllable for each displayed representation.

In some embodiments, the control device can be configured to control the active illumination apparatus to change the displayed representation of the virtual background at an image refresh rate. Furthermore, in such embodiments, the control device can be configured to control the lens arrangement in accordance with the image refresh rate—and thus individually for each displayed representation.

The background display device can be configured to display time-varying representations of the virtual background in order, for example, to display movements in the virtual background or to adapt the representation to changing positions of a camera by which a scene is recorded in the virtual image recording studio. This can take place at a predefined and/or settable image refresh rate so that the displayed representation can, for example, be changed by appropriately controlling the active illumination apparatus and/or the picture elements at an image refresh rate of 24 hertz, 48 hertz or 96 hertz during a recording in the virtual image recording studio. The image information displayed on the background display device by the active illumination apparatus can consequently be refreshed at the image refresh rate. Since the control device is configured to individually control the lens arrangement in accordance with the image refresh rate for each displayed representation, an individual beam characteristic can also be set for each displayed representation.

For this purpose, the lens arrangement can in particular also be controllable at the image refresh rate, wherein the control device can, for example, be configured to control the lens arrangement and the active illumination apparatus in parallel. The settings of the lens arrangement can thereby be adapted or the adaptation can at least be started, while the respective representation to be displayed is built up at the background display device. Due to the possibility of controlling the lens arrangement quickly and, for example, within a few milliseconds, for instance in the course of an electrical control, or of adapting settings of the lens arrangement within a few milliseconds, the settings of the lens arrangement can already be adapted to the respective representation when the representation is built up at the background display device and/or as soon as a recording by the associated camera takes place. Such a fast control of the lens arrangement in particular also makes it possible to change its settings during an exposure pause of the associated camera, and accordingly at a time at which no recording is generated, so that the correct settings are present as soon as a recording is performed. A synchronization between the camera and the background display device can also be provided for this purpose.

To achieve such an image-synchronous control of the lens arrangement, the control device can be configured to generate a control command for each picture element, which can in particular relate to the brightness and/or color of said picture element, and to simultaneously generate a control command for the lens arrangement in order to adapt the beam characteristic of the picture elements. In some embodiments, a change of the representation of the virtual background, in particular each change of the representation, can therefore comprise a change of the control of the picture elements and a change of the control of the lens arrangement. As will be explained in more detail below, a respective lens can in particular be associated with each picture element so that, in some embodiments, the control device can be configured, for each representation to be displayed, to generate a respective control command for each of the picture elements and a respective control command for each of the lenses.

In some embodiments, the lens arrangement can comprise a plurality of lenses, wherein each lens can be associated with at least one respective picture element. In some embodiments, each lens can in particular be associated with exactly one respective picture element (for example, a light-emitting diode or a light-emitting diode unit, as explained above). Thus, the beam characteristic of the individual picture elements can be influenced by controlling the lens arrangement. Alternatively thereto, each of the lenses can be associated with a plurality of picture elements (for example, with a plurality of light-emitting diodes or a plurality of light-emitting diode units) so that the beam characteristic of the plurality of associated picture elements can be collectively set by controlling a respective lens.

In some embodiments, each of the lenses can be individually controllable to individually influence a beam characteristic for the picture element or the picture elements with which a lens is associated. In other embodiments, provision can be made that several of the plurality of lenses can be collectively controlled by the control device to adapt the beam characteristic of the associated picture elements together and in the same manner. For example, due to such a collective control, light emitted by the background display device can be expanded overall or a focusing of the emitted light on a specific point, for example the real subject, can take place to achieve a correspondingly focused illumination of the real subject. An association of the plurality of lenses with such a collective control can be predetermined or variable.

In some embodiments, each picture element can be associated with a respective lens. A beam characteristic of each picture element of the plurality of picture elements can thus be changeable and/or adaptable by controlling the lens arrangement. In this respect, an individual control of each lens of the lens arrangement or a collective control can generally again be provided to be able to individually adapt the beam characteristic of each picture element or to be able to collectively adapt the beam characteristic of the plurality of picture elements.

In some embodiments, the control device can be configured to individually control each of the plurality of lenses. The control device can thus in particular be configured to individually adapt a beam characteristic for each picture element with which a respective lens is associated by controlling the lens arrangement. Due to such a control, in particular the design freedom when using a background display device for displaying a representation of a virtual background can be extended and the beam characteristic of the background display device can, for example, be sectionally set in order, in dependence on a respective recording situation, to enable the most ideal display of the representation of the virtual background and/or imaging of the representation of the virtual background by the associated camera and/or illumination of the real subject. For example, provision can be made with such a control to selectively use the picture elements of a section of the background display device to illuminate the real subject, wherein the light emitted by these picture elements can be focused on the real subject, for example. In further sections of the background display device, the representation of the virtual background can, in contrast, be displayed and the light emitted by the picture elements used for this purpose can, for example, be expanded by appropriately controlling the lens arrangement and/or the respective lenses.

It can in particular be achieved by appropriately controlling the lens arrangement that a focused light beam is also emitted at the background display device by light sources that are displayed on the background display device and that emit a directed light beam in a real background corresponding to the virtual background. Furthermore, by expanding the light emitted by picture elements that serve to display a subject that reflects light isotropically in the real background, it can be achieved that these subjects are also shown apparently emitting light isotropically in the displayed representation in order to be able to display the subject with a natural beam characteristic.

Furthermore, in some embodiments, provision can be made that the light emitted by the picture elements can be expanded by controlling the lens arrangement. Light emitted by a respective picture element can in particular be selectively expanded by a control of the lens arrangement in order to achieve a broad light emission in the virtual imaging studio.

Due to such an expansion and/or scattering of the emitted light, in particular a further problem occurring on the use of background display devices for displaying representations of virtual backgrounds for a direct camera recording can furthermore be countered, which problem can in particular arise on an imaging of the representations of the virtual background displayed in a regular grid of picture elements by a digital camera. Such a digital camera can have an image sensor comprising a plurality of light-sensitive sensor elements that can be arranged in a plurality of rows and columns and thus likewise in a regular orthogonal grid. Since, however, both the representation of the virtual background and the light-sensitive element of the camera, the image sensor, can have a regular grid, superpositions of the two grids can occur in an image of the virtual background generated by the camera and can be reflected as a moiré effect and/or an alias effect in the image generated by the camera or in a display of the image generated by the camera. Due to the superposition of the two regular grids, the image generated by the camera can therefore include geometric patterns that are not included in the representation of the virtual background and/or in the virtual image recording studio. However, by expanding the light emitted by the picture elements, the regular grid of the picture elements can so-to-say be broken so that a superposition with a regular grid of the light-sensitive sensor elements of a camera and the occurrence of moiré effects in an image generated by the camera can be avoided and/or reduced.

In some embodiments, each of the plurality of lenses can comprise an electrical polymer actuator. Such an electrical polymer actuator can, for example, also be referred to as an electroactive polymer and/or an electrostrictive polymer.

The configuration of the lenses with an electrical polymer actuator in particular makes it possible to change the shape of the polymer actuator by applying an electrical voltage to it and thereby, for example, to influence the shape of the associated lens and/or its orientation and/or its position. Such a shape change of the polymer actuator can in particular already be achieved by small voltages so that a precise and direct control of the lens arrangement and/or of the lenses can be made possible in order, for example, to be able to adapt a lens shape in dependence on the situation without relevant time delays and, for example, in the range of milliseconds. Due to the configuration of the lenses with a polymer actuator, a change of lens shapes and/or orientations and/or positions can in particular also be achieved with a small design of the lenses so that the lenses can, for example, be configured as microlenses and can be associated with respective correspondingly small picture elements, for example light-emitting diodes, to be able to influence their beam characteristic.

In some embodiments, the lenses can have a respective lens membrane that can be deformed by controlling the polymer actuator.

Such a lens membrane can in particular form the optically active part of the lens so that the optical properties of the lens can be adapted by deforming the lens membrane. A deformation of the polymer actuator as a result of an electrical control by the control device can thus in particular be transmitted to the lens membrane to change the optical properties of the lens. As already explained, the configuration of the lenses with polymer actuators enables a fast control and an immediate reaction in the sense of a deformation of the polymer actuator and, in response thereto, also of the lens membrane so that the lenses can, for example, be adapted in dependence on the situation and continuously during a recording in the virtual image recording studio.

Furthermore, a continuous adaptation of the shape of the lens membrane can be achieved by an electrical polymer actuator by a corresponding selection of the voltages for its control in order, for example, to also be able to continuously and arbitrarily set a focal length and/or a refractive power of the lens through a continuous change of the lens shape.

In some embodiments, the lens membrane can be arranged between two microfluid chambers filled with fluid, wherein the fluid of a respective microfluid chamber can be selectively pressed against the lens membrane by controlling the polymer actuator.

By controlling the polymer actuator, a pressure can thus in particular be generated in one of the microfluid chambers to be able to correspondingly exert a pressure on the lens membrane at one side and thereby to be able to deform the lens membrane. To enable as controlled as possible an adaptation of the beam characteristic of a respective associated picture element in such a configuration of the lens, the fluid can in particular be permeable to light and/or have a refractive index close to one. The influencing of the beam characteristic of a respective picture element can thus primarily be determined by the lens membrane. The fluid can in particular be an oil.

Due to a design as explained above, the lenses of the lens arrangement can in particular be configured as microlenses to be able to be associated with respective picture elements that are in particular also small. For example, such lenses can be formed with an opening of 3 mm and can have dimensions of approximately 10 by 10 $mm^2$ that can primarily be determined by the microfluid chambers. Furthermore, with such lenses, a refractive power variation of 15 diopters, can, for example, be achieved by deforming the lens membrane, wherein, however, further variations can also be achievable, if necessary.

In some embodiments, a focal length of the lenses can be settable. A refractive power of the lenses can in particular be settable.

Provision can further be made that the focal length of each of the lenses is individually and/or continuously settable. As already explained, this can, for example, take place in that a deformation of the lenses is controlled by appropriately controlling the lens arrangement in order, for instance, to influence a radius of curvature of the lens. In particular, it can thereby, as already explained, for example, be achieved to individually influence a beam characteristic of the light emitted by the picture element for each picture element with which a lens is associated.

In some embodiments, the lenses can be configured as diverging lenses. The lenses can thus in particular be configured to expand light emitted by the respective associated picture elements. Such an expansion of the light beam can in particular make it possible to avoid the moiré effects and/or alias effects explained above in an image of the representation of the virtual background generated by the camera due to a superposition of a regular grid of the picture elements with a regular grid of light-sensitive sensor elements of the camera. Furthermore, such an expansion of the emitted light of the background display device can, for example, be used in certain recording situations and in particular for as comprehensive as possible an illumination of the image recording studio and/or of the real subject.

In some embodiments, the control device can be configured to change a position and/or an orientation of the lenses. For example, the control device can be configured to tilt a respective lens and/or the lenses of the lens arrangement by controlling the lens arrangement in order thereby also to influence and in particular to direct the light emitted by the picture elements. The control device can also be configured, by controlling the lens arrangement, to change a position of a respective lens relative to the associated picture element and to move the lens toward the picture element or away from the picture element, for example. For this purpose, the lens as a whole can, for example, be movable and/or alignable or a respective optically effective element of the lens, in particular the aforementioned lens membrane, can be movable and/or alignable by controlling the lens arrangement and in particular a polymer actuator. However, provision can also be made that the optically effective elements of the lenses are arranged in a respective lens frame, wherein the lens frame can, for example, be tiltable and/or linearly movable to change a position and/or an orientation of the lens, and in particular of the optically effective element of the lens, relative to the associated picture element.

In some embodiments, the lens arrangement can comprise at least one lens array that has a plurality of lenses connected to one another. For example, the lens arrangement can comprise a plurality of lenses that are configured as respective wafers and that are connected to form a lens array. Furthermore, the lens arrangement can in particular comprise a single lens array for the at least one panel that can, for example, be arranged above the picture elements with respect to the picture elements of the at least one panel. Alternatively thereto, the lens arrangement for the at least one panel can, however, also comprise a plurality of lens arrays that can be distributed over the panel and/or that can be arranged adjoining one another above the picture elements.

In some embodiments, the lens array can comprises a lens frame in which the plurality of lenses are held. Such a lens frame can in particular be arranged above the picture elements to be able to arrange the lenses encompassed by the lens array above the respective picture elements. In this regard, the lens frame can also be understood as a carrier of the lens arrangement and/or the lenses at which the individual lenses are held and/or to which at least one panel is attached.

In some embodiments, the lens frame can be impermeable to light and/or can have an anti-reflective coating. The light emitted by the picture elements can thus in particular be influenceable by the lenses held by the lens frame, but not by the lens frame, and can thus be intentionally influenceable by controlling the lens arrangement. Since the lens frame can further have an anti-reflective coating, reflections from the lens frame can be prevented from influencing and/or interfering with the display of the representation of the virtual background and/or an image of the representation of the virtual background generated by the associated camera.

In some embodiments, the lenses of the lens array can be connected to one another by wafer bonding. This can in particular enable a simple manufacture of the lenses with a small design of the lenses as microlenses by manufacturing the respective lenses as wafers and then connecting them to form a lens array. Furthermore, the microfluid chambers already mentioned above can be formed by such a wafer bonding.

In some embodiments, the active illumination apparatus can comprise a plurality of panels, wherein each of the plurality of panels can be formed as rectangular and without edges, and wherein the plurality of panels can be arranged in an at least two-dimensional matrix (planar or arched). Each of the plurality of panels and/or the at least one panel can in particular be square. Thus, the background display device can be assembled by a plurality of panels, wherein, for example, a respective section of the representation of the virtual background and, through the assembly of the plurality of panels, ultimately the representation of the virtual background can be displayed at each of the plurality of panels. Since the plurality of panels can in particular be formed without edges, the representation of the virtual background can also be displayed at transitions between two panels without an interruption at the background display device.

The invention further relates to a method of displaying a representation of a virtual background by a background display device, in particular a background display device as disclosed herein, for a recording by a camera in a virtual image recording studio. The background display device has an active illumination apparatus, which comprises at least one panel having a plurality of picture elements in an at least two-dimensional arrangement, and a lens arrangement that comprises a respective individually controllable lens for each picture element of the plurality of picture elements. In the method, the representation of the virtual background is generated, the picture elements are controlled to display the representation of the virtual background and the lens arrangement is controlled to change a beam characteristic of the picture elements.

As already explained, a representation of a virtual background can be flexibly displayed in a virtual image recording studio by such a method so that the representation and/or the virtual background is/are imaged directly by the associated camera and does/do not have to be subsequently added to the generated image, for example. The adaptation of the beam characteristic of the picture elements also makes it possible to flexibly adapt the display of the representation of the virtual background to specific recording situations and, for example, to use the background display device and/or sections of the background display device for an illumination and, for example, for a focused illumination of the real subject, for instance an actor, in certain recording situations. Provision can furthermore be made to collectively adapt the beam characteristic of all the picture elements with which a respective lens is associated by controlling the lens arrangement, or the lenses of the lens arrangement can be individually controllable to be able to individually adapt the beam characteristic of each of the associated picture elements. The lens arrangement can in particular comprise a respective lens for each picture element.

In some embodiments, light emitted by the picture elements can be expanded by controlling the lens arrangement. The moiré effects and/or alias effects mentioned above can hereby in particular be avoided in an image of the representation of the virtual background generated by the camera. Furthermore, a uniform illumination of the virtual image recording studio can, for example, be achieved by such an expansion.

In some embodiments, the displayed representation of the virtual background can be changed at an image refresh rate and the lens arrangement can be individually controlled for each displayed representation. As already explained, an image-synchronous control of the lens arrangement can thus take place in order, in the case of time-variable displayed representations of the virtual background, to be able to perform an appropriate control of the lens arrangement for each representation.

Furthermore, in some embodiments, the representation of the virtual background can be recorded by the camera in the method. Thus, an image can in particular be generated in the virtual image recording studio by an associated camera, wherein the camera can in particular record a plurality of consecutive images to create a moving image sequence. In these images, the representation of the virtual background can be directly recorded by the camera so that a background, for example as in the case of a green screen recording, does not have to be subsequently added to a scene recorded in the virtual image recording studio, for example to an acting scene for a movie.

The invention will be explained in the following purely by way of example with reference to embodiments and to the drawings.

There are shown.

Figure 1:
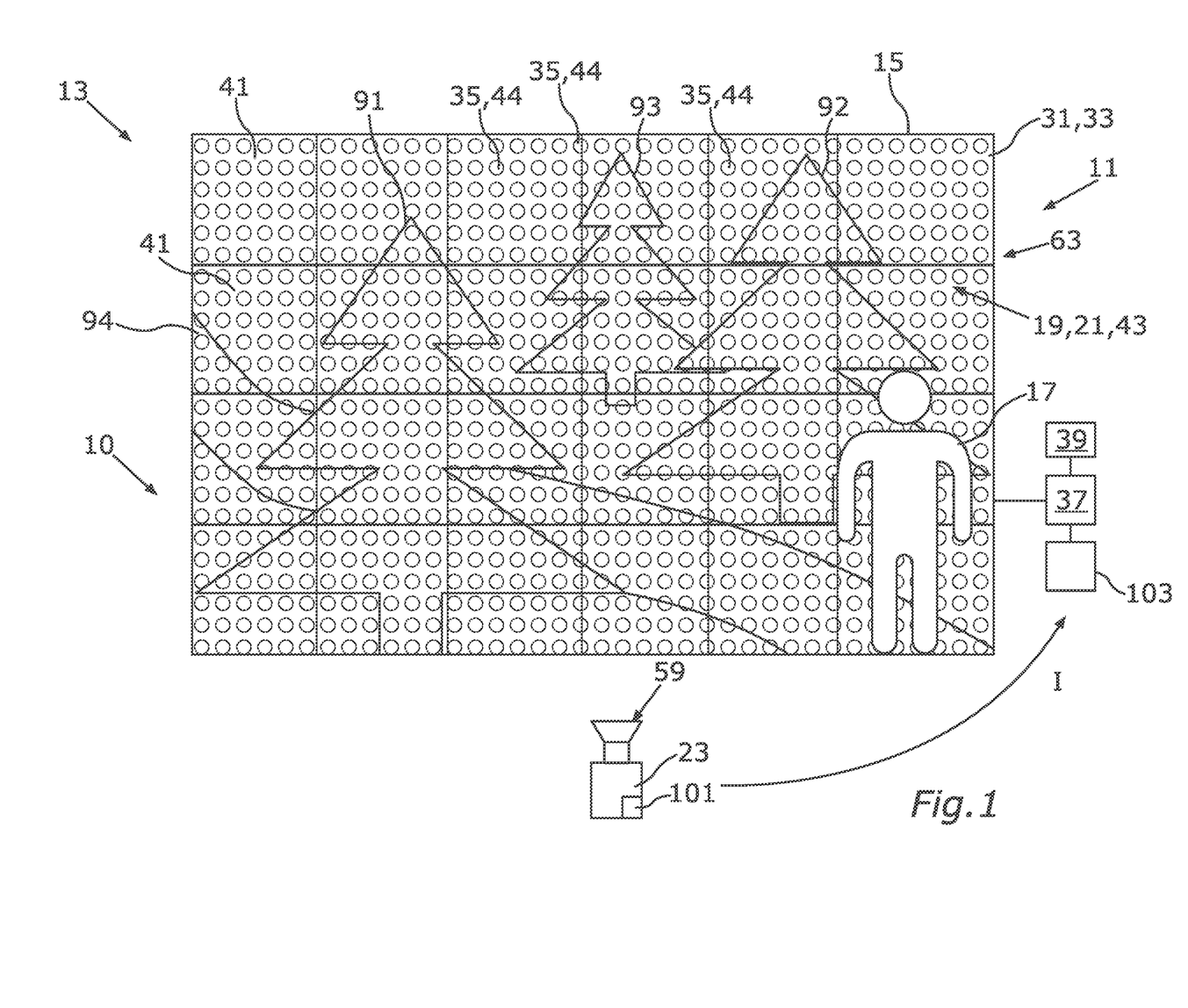
FIG. 1 a schematic representation of a recording system for an image recording studio with a background display device for displaying a representation of a virtual background, which has an active illumination apparatus having a plurality of picture elements, and with a camera.

FIG. 1 schematically shows a virtual image recording studio 13, in which a scene, in particular in the form of a moving image recording and/or a photo recording, can be recorded by an associated camera 23. The camera 23 can, for example, be designed as a moving image camera in order to carry out moving images recordings that can be stored as a series of images generated by the camera 23. For this purpose, the camera 23 has a lens 59 that can in particular be designed as an interchangeable lens and that can selectively be connected to a housing of the camera 23. As a result, a respective lens 59, optimally adjusted to the environment in the image recording studio 13, can always be used in order to be able to generate the best possible recordings. An image sensor 1 comprising a plurality of light-sensitive sensor elements can in particular be arranged in the housing of the camera 23, onto which sensor elements light, which enters via a diaphragm aperture of a diaphragm, can be guided by a lens system or at least one lens to generate an image (cf. FIG. 2).

Furthermore, a background display system 11 having a background display device 15 is arranged in the image recording studio 13 and, together with the camera 23, forms a recording system 10. The background display device 15 comprises an active illumination apparatus 31 configured as an LED wall 33 and is configured to display a representation 19 of a virtual background 21 for a recording by the camera 23. For this purpose, the illumination apparatus 31 or the LED wall 33 has a plurality of actively illuminating picture elements 35 that are arranged next to one another in a two-dimensional arrangement. For example, the picture elements 35 can be configured as individually controllable light-emitting diodes 44 or as individually controllable light-emitting diode units 45, wherein each of such a light-emitting diode unit 45 can comprise a plurality of light-emitting diodes 44, in particular three light-emitting diodes 44 (cf. FIG. 3). Provision can in particular be made that the picture elements 35 are configured as light-emitting diode units 45 having three respective light-emitting diodes 44, wherein one of the three light-emitting diodes 44 can emit red light, one light-emitting diode 44 can emit green light and one light-emitting diode 44 can emit blue light. The light-emitting diode unit 45 can furthermore comprise a color mixer to be able to set a respective color and/or brightness emitted by the picture element 35 by a respective individual control of the light-emitting diodes 44 of a light-emitting diode unit 45. The light-emitting diodes 44 can, for example, be configured as LEDs or as organic light-emitting diodes 44 or OLEDs. Background display devices for displaying a representation of a virtual background that generate the representation by a rear projection can generally also be used in the image recording studio 13.

The background display device 15 further comprises a plurality of panels 41. A respective plurality of the actively illuminating picture elements 35 are arranged at each panel 41 of the plurality of panels 41 so that a section of the representation 19 of the virtual background 21 can be displayed at each of the panels 41. The panels 41 are in particular rectangular and/or square and formed without edges so that the representation 19 of the virtual background 21 can also be displayed without visible interruptions at the transitions between panels 41. The panels 41 are further arranged in a two-dimensional matrix to form the background display device 15. In this regard, the active illumination apparatus 31 comprises a plurality of panels 41 in the embodiment shown.

The representation 19 of the virtual background 21 reflects here, for example, a three-dimensional scene 43 with objects 91, 92, 93 and 94, three trees and a path, which can be generated by appropriate control of the picture elements 35, in particular, by an appropriate setting of their respective color and brightness. The three-dimensional scene 43 is projected onto the essentially two-dimensional arrangement of the picture elements 35 of the illumination apparatus 31, wherein, in particular, the objects 91, 92 and 93 appear at a different distance to the illumination apparatus 31 or the background display device 11, in order to recreate the three-dimensionality of a real background corresponding to the virtual background 21.

In particular, the representation 19 of the virtual background 21 by way of the background display device 15, serves to generate a background for a recording of a real subject 17, for example an actor, in front of which a recording can be made or a film scene can be played. As a result, basically any kind of landscapes, spaces or environments can be created in the image recording studio 13, in front of, or, in which, a scene, for example, for a movie, is to be filmed. It is furthermore possible, by a time-variable control of the picture elements 35, to show movements in the virtual background 21, for example, a passing car, to which the actor 17 can react in an easy and improved manner compared to a scene in front of a green screen.

The background display device 15 extends here essentially in the vertical direction so that the actor 17 can move in front of the virtual background 21. However, in order to be able to depict the virtual background 21 more extensively, the background display device 15 can also extend around or above the actor 17, wherein the background display device 15 above the actor 17 can exhibit, in particular, a horizontal orientation. In order to be able to surround the actor 17 or to generate a transition from the shown vertical orientation to a horizontal orientation, the background display device 15 or the illumination apparatus 31 or the LED wall 33 can also be at least sectionally arched or curved.

In addition to representing the virtual background 21, the background display device 15 can also serve to illuminate the real subject 17 and thereby facilitate, for example, a further studio lighting for the image recording studio 13. Furthermore, by illuminating the real subject 17 by the background display device 15, the interaction of the real subject 17 or the actor 17 with light sources present in the virtual background 21, for example, lanterns or lamps, can be improved in that the real subject 17 casts a shadow which corresponds to the light conditions visible in an image generated by the camera 23.

To be able to generate the representation 19 of the virtual background 21 and to control the picture elements 35 to display the representation, the background display device 15 has a control device 37 that is connected to a memory 39. A model of the virtual background 21 can in particular be stored in the memory 39 so that the control device can generate the virtual background 21 based on the model. Furthermore, the control device 37 can be configured to project the virtual background 21 onto the background display device 15 and in particular the two-dimensional arrangement of the picture elements 35.

Figure 2:
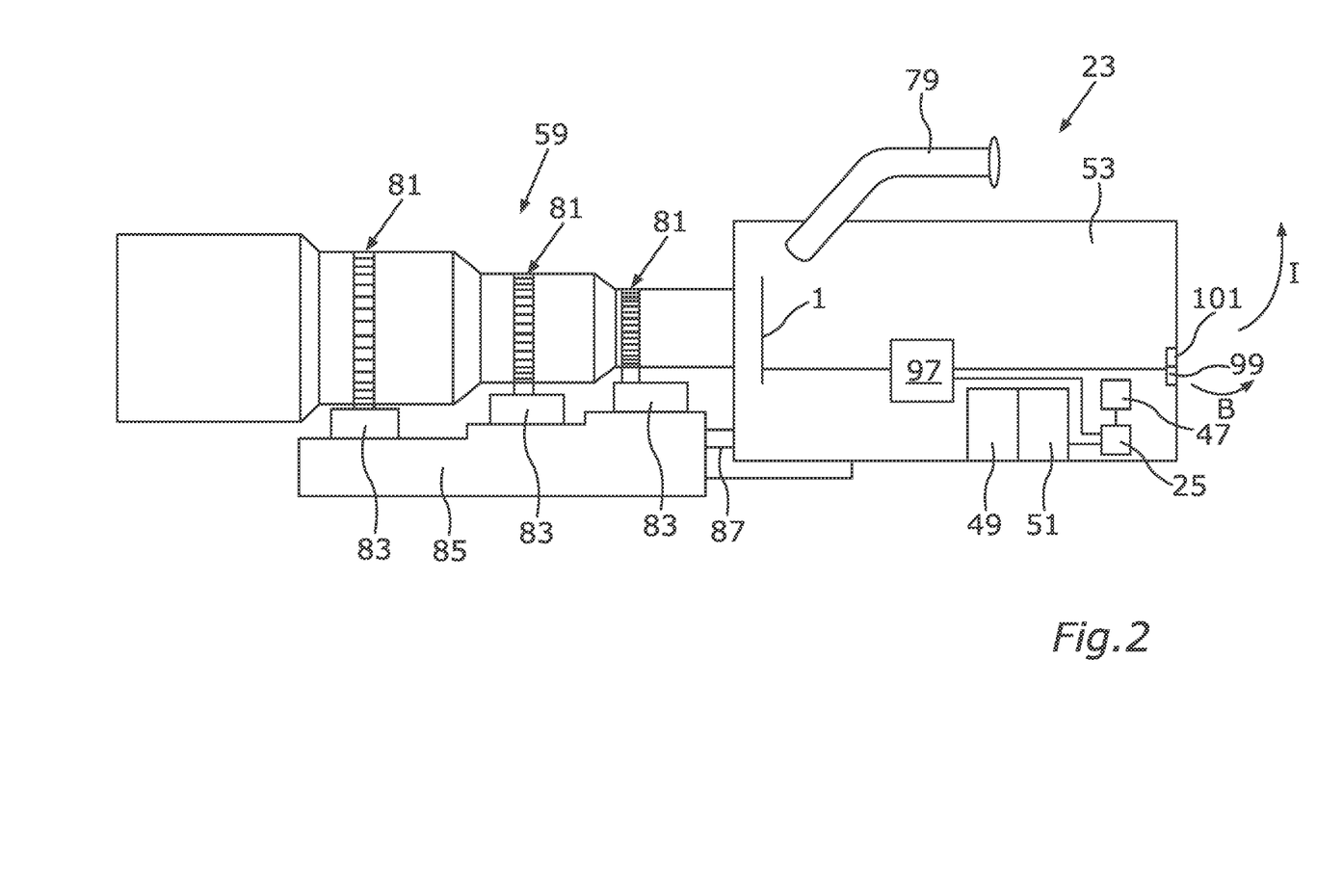
FIG. 2 a schematic representation of the camera provided for a recording in the image recording studio.

A possible embodiment of the associated camera is schematically shown in FIG. 2. The camera 23 has a camera body 53 to which a lens 59 is fastened. The lens 59 can in particular be configured as an interchangeable lens so that selectively various configured lenses 59 can be connected to the camera body 53 and a lens 59 that is optimal for a respective recording can always be selected. The lens 59 has three lens rings 81 by which the respective parameters of the lens 59 can be set. For example, a focusing distance, a focal length, a zoom factor and/or a diaphragm aperture, in particular an aperture of an iris diaphragm, can be set or adapted by rotating a respective one of the lens rings 81. The camera 23 can in particular be configured as a motion picture camera or moving image camera to be able to consecutively generate a sequence of images 73 that can, for example, be played as a film.

To be able to adjust the lens rings 81, a lens ring drive unit 85 is connected to the camera body 53 via a holding rod 87 and comprises a respective lens setting motor 83 for each of the lens rings 81. The lens rings 81 can be rotated by these lens setting motors 83 and adjustments to the lens 59 can be made as a result. In particular, the lens ring drive unit 85 can be actuated remotely so that said lens parameters can be set or changed remotely.

At the camera body 53, a further display device 49 is arranged via which information about settings of the camera 23 can be displayed to a user. The display device 49 can in particular be a display. The camera 23 furthermore has an input device 51 which is arranged at the camera body 53 and via which the user can make settings of the camera 23. An exposure time of the camera 23 can in particular be settable at the input device 51, wherein a control device 25 connected to the input device 51 can be configured to control the camera 23 in accordance with the input exposure time. The display device 49 and the input device 51 can in particular be formed by a touch screen via which both information can be displayed to the user and user inputs can be received.

In order to generate an image of incident light through the lens 59, the camera 23 further comprises an image sensor 1 arranged within the camera body 53. This image sensor 1 can be configured based on, for example, CMOS technology or CCD technology and comprise a plurality of light-sensitive sensor elements that can be arranged in a plurality of rows and columns. Furthermore, the camera 23 has a readout circuit 97 that is configured to read out, process and digitize the signals of the respective sensor elements and to output them to or via a signal output 99. For this purpose, the readout circuit 97 can in particular comprise amplifiers, multiplexers, analog-digital converters, buffer memories and/or microcontrollers. Ultimately, an image data set B can thus be generated by the camera 23, which corresponds to the image or an image of a field of view of the camera 23, and the image data set B can be output via the signal output 99. In order to check the field of view of the camera 23 and to be able to align the camera 23 onto a respective image section, a viewfinder 79, through which a cameraman can look through, is also arranged on the camera body 53. Furthermore, the control device 25 is connected to a memory 47 and can, for example, be configured to selectively write the image data set B into the memory 47 or to output it via the signal output 99.

Furthermore, the background display device 15 has an interface 103 and the camera 23 has an interface 101 via which information I can in particular be transmittable from the camera 23 to the background display device 15. The control device 37 of the background display device 15 can in particular be configured to control the active illumination apparatus 31 in dependence on information I received from the camera 23.

Figure 3:
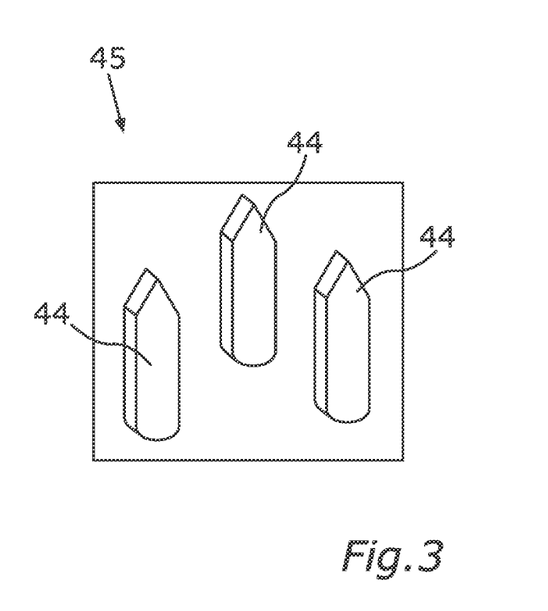
FIG. 3 a schematic representation of a light-emitting diode unit that comprises three individually controllable light-emitting diodes.

Thus, the background display device 15 can in particular comprise picture elements 35 that are arranged at a plurality of panels 41 and that are configured to display the representation 19 of the virtual background 21 on the background display device 15 through an emission of light. These picture elements 35 can in particular be formed by individual light-emitting diodes 44 or by light-emitting diode units 45, as FIG. 3 illustrates. Such a light-emitting diode unit 45 can in particular comprise three light-emitting diodes 44 that are configured to emit light of different colors so that a respective color emitted by the light-emitting diode unit 45, and thus by the picture element 35, can be set by mixing the respective emission spectra of the three light-emitting diodes 44 or by appropriately controlling the three light-emitting diodes 44 by the control device 37.

While the configuration of the background display device 15 with such picture elements 35 makes it possible to flexibly display the representation 19 of the virtual background 21 for a recording by the associated camera 23 in the image recording studio 13 so that the camera 23 can in particular directly image the representation 19 of the virtual background 21, a beam characteristic S of the picture elements 35, for example a width of the light irradiated from the picture elements 35, can generally not be directly influenced at the picture elements 35. Rather, such a beam characteristic S can be determined by the arrangement of the picture elements 35 and/or a type or a kind of the picture elements 35 and, for example, of the light-emitting diodes 44 used. However, this undesirably restricts the design possibilities during the display of the representation 19 of the virtual background 21 on the background display device 15 and can, for example during a focused light emission by the picture elements 35, result in moiré effects or alias effects in an image of the representation 19 of the virtual background 21 generated by the camera 23 in that the regular arrangement of the picture elements 35 can be superposed with a regular arrangement of light-sensitive sensor elements of the image sensor 1 of the camera 23 that can in particular be arranged in rows and columns.

However, to be able to influence the beam characteristic S of the picture elements 35 flexibly and, for example, in dependence on the situation, the background display device 15 has a controllable lens arrangement 61, wherein the control device 37 is configured to adapt the beam characteristic S of at least some picture elements 35 by controlling the lens arrangement 61.

Figure 4:
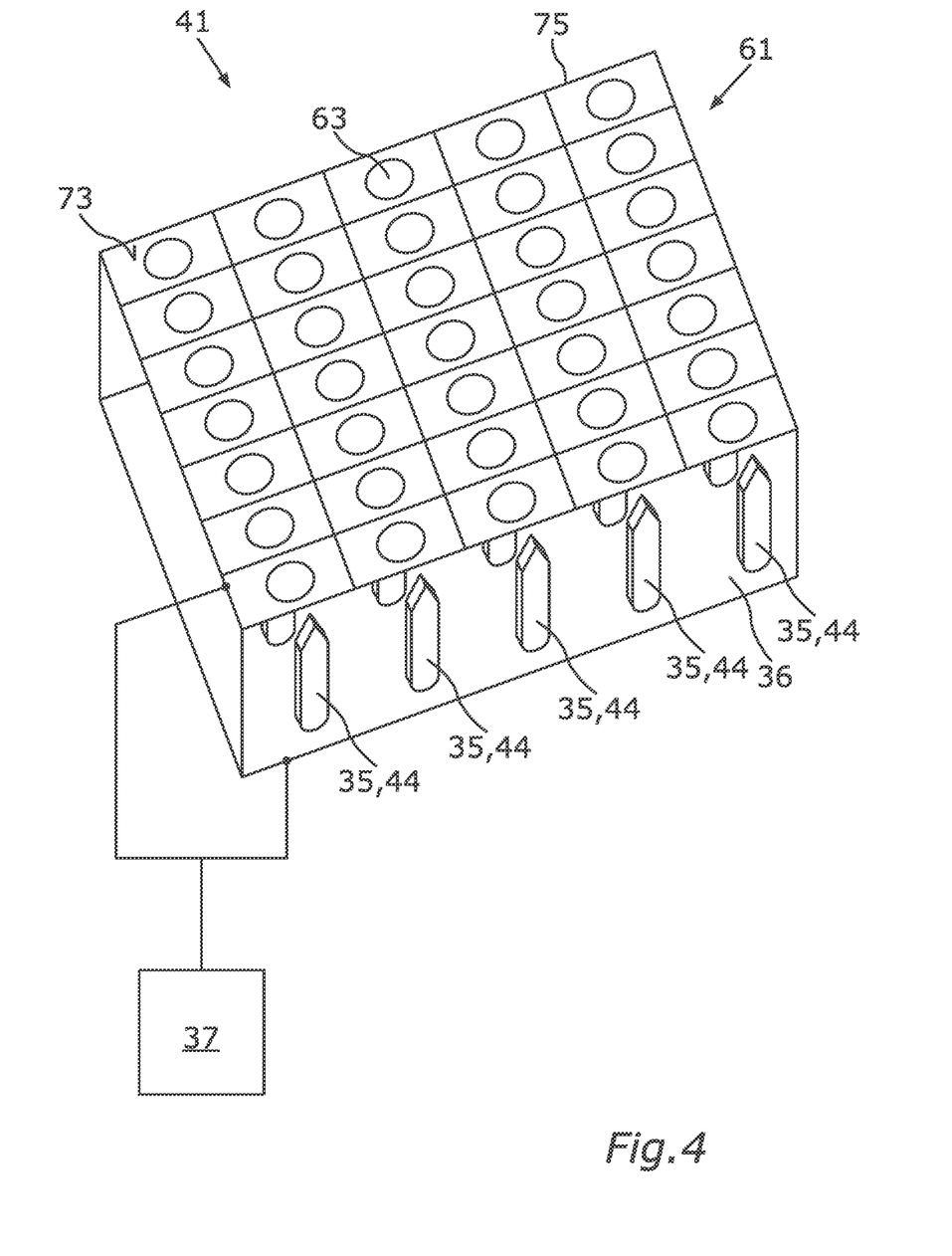
FIG. 4 a schematic representation of a panel of the active illumination apparatus and of a controllable lens arrangement for adapting a beam characteristic of the picture elements of the active illumination apparatus arranged at the panel.

For this purpose, as FIG. 4 shows, the lens arrangement 61 comprises a lens array 73 in which a plurality of lenses 63 are arranged. The lens array 73 comprises a lens frame 75 in which the lenses 63 are held and which is supported at a picture element carrier 36 on which the picture elements 35 are arranged.

In the embodiment shown, a respective lens 63 is associated with each of the picture elements 35 of the panel 41, which are shown by way of example as individual light-emitting diodes 44, but can also be configured as light-emitting diode units 45, so that the beam characteristic S of all the picture elements 35 can be adapted by controlling the lens arrangement 61. For this purpose, provision can be made that all the lenses 63 of the lens arrangement 61 can be individually controlled so that the beam characteristic S of each picture element 35 can also be individually adaptable, or provision can be made that the lenses 63 of the lens arrangement 61 can be collectively controlled to be able to adapt a collective beam characteristic of the picture elements 35 of the background display device 15 and/or of a panel 41 of the background display device 15.

Furthermore, the arrangement of the lenses 63 in the lens array 73 makes it possible to manufacture the individual lenses 63 on a wafer basis and to connect them by wafer bonding to form the lens array 73. For example, provision can be made that a single lens array 73 having a plurality of lenses 63 is provided for a panel 41 of the background display device 15, wherein, alternatively thereto, a plurality of lens arrays 73 can also be distributed over a panel 41 and can in particular be attached to the picture element carrier 36 adjoining one another.

Such a configuration of the lens arrangement 61 with lenses 63 that can be manufactured on a wafer basis furthermore makes it possible to form the lenses 63 with a small extent to be able to associate the lenses 63 with a respective picture element 35, and in particular with a respective light-emitting diode 44 or a respective light-emitting diode unit 45. For example, the lenses 63 or the corresponding wafers can have an extent of $10 \times 10$ mm$^2$ for this purpose. To avoid an interference of the display of the representation 19 of the virtual background 21 by the lens arrangement 61, the lens frame 75 can further be impermeable to light so that the beam characteristic S of the picture elements 35 can at least primarily be influenceable by the lenses 63 and thus in a controlled manner. Furthermore, the lens frame 75 can be coated by an anti-reflective coating to avoid a reflection of light and a thereby induced interference of the display of the representation 19 of the virtual background 21 or of an image which the camera 23 generates.

Furthermore, provision can be made that a respective lens 63 is associated with each of the picture elements 35. This can make it possible to individually adapt the beam characteristic S of each of the picture elements 35 of the panel 41. As already explained, each lens 63 of the lens arrangement 61 can be individually controllable by the control device 37 for this purpose. FIGS. 5A to 5D illustrate a possible embodiment of the lenses 63 that enables such an individual control of the lenses 63 to be able to intentionally influence the beam characteristic S of a respective picture element 35.

Figure 5A:
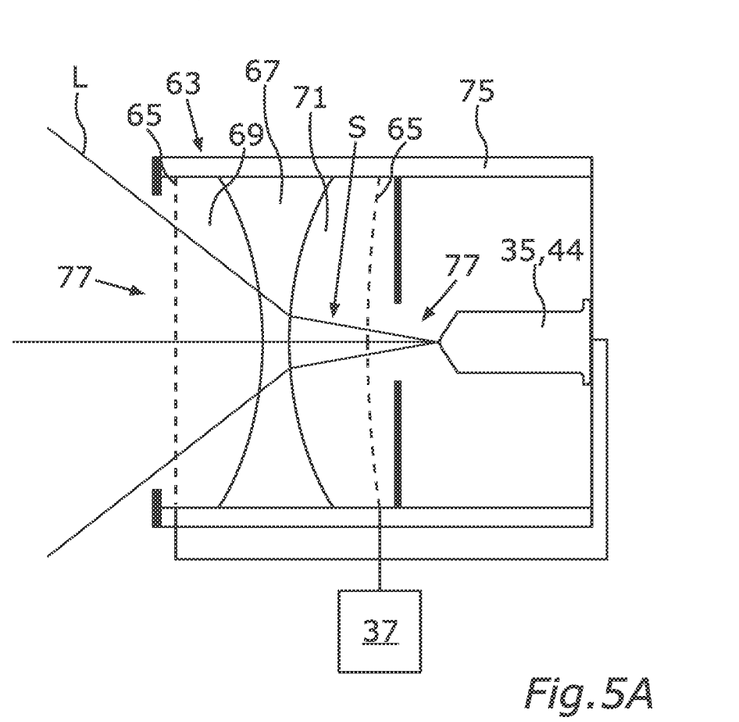
FIGS. 5A to 5D a respective schematic representation of a lens of the lens system for illustrating the adaptation of the beam characteristic of a picture element.

The lens 63 shown in FIG. 5A has a deformable lens membrane 67 that forms the optically active element of the lens 63. The lens membrane 67 is arranged between two microfluid chambers 69 and 71 filled with fluid and the lens 63 comprises polymer actuators 65 that are shown by dashed lines and that can be deformed as electroactive or electrostrictive polymers by an electrical control by the control device 37. In this regard, the control device 37 can be configured to electrically control the lens arrangement 61.

The lens arrangement 61 can in particular be controllable by applying an electrical field. The configuration of the lenses 63 with polymer actuators 65 furthermore enables a control of the lenses 63 and of the lens arrangement 61 by small voltages so that settings of the lenses 63 can be changeable within a few milliseconds, for example, within 10 milliseconds or within 20 milliseconds. Due to such a fast control of the lenses 63, the lenses 63 can furthermore in particular be controlled in an image-synchronous manner in order, for example on a display of time-varying representations 19 of the virtual background 21, to be able to individually adapt the control of the lens arrangement 61 for each of the displayed representations 19.

The lens 63 further has two mutually oppositely disposed openings 77 through which a light beam L emitted by the associated picture element 35 can enter the fluid chamber 71 and can exit the fluid chamber 69 to display the representation 19 of the virtual background 21. The opening 77 associated with the fluid chamber 69 can in particular have a diameter of 3 mm. The fluid included in the microfluid chambers 69 and 71 can in particular be permeable to light and have a refractive index close to one so that the influencing of the beam characteristic S of the picture element 35 can be substantially determined by the lens membrane 67. The fluid included in the microfluid chambers 69 and 71 can in particular be an oil.

As FIG. 5A shows, the lens 63 illustrated there is configured as a diverging lens and/or is controlled to act as a diverging lens so that the light beams L emitted by the picture element 35 are expanded by the lens 63 and the beam characteristic S of the picture element 35 is changed in the sense of an expansion in this regard. Due to such an expansion, the regular grid of the picture elements 35 at the panel 41 can in particular so-to-say be interrupted in order, for example, to prevent a superposition of this grid with a regular arrangement of sensor elements of the image sensor 1 of the camera 23 and thereby arising imaging errors in an image generated by the camera 23.

Figure 5B:
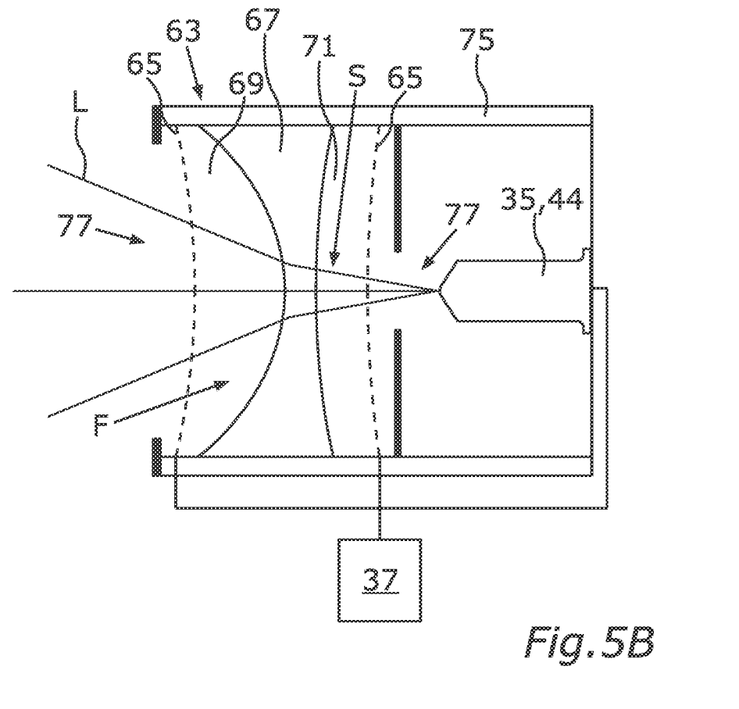
Figure 5C:
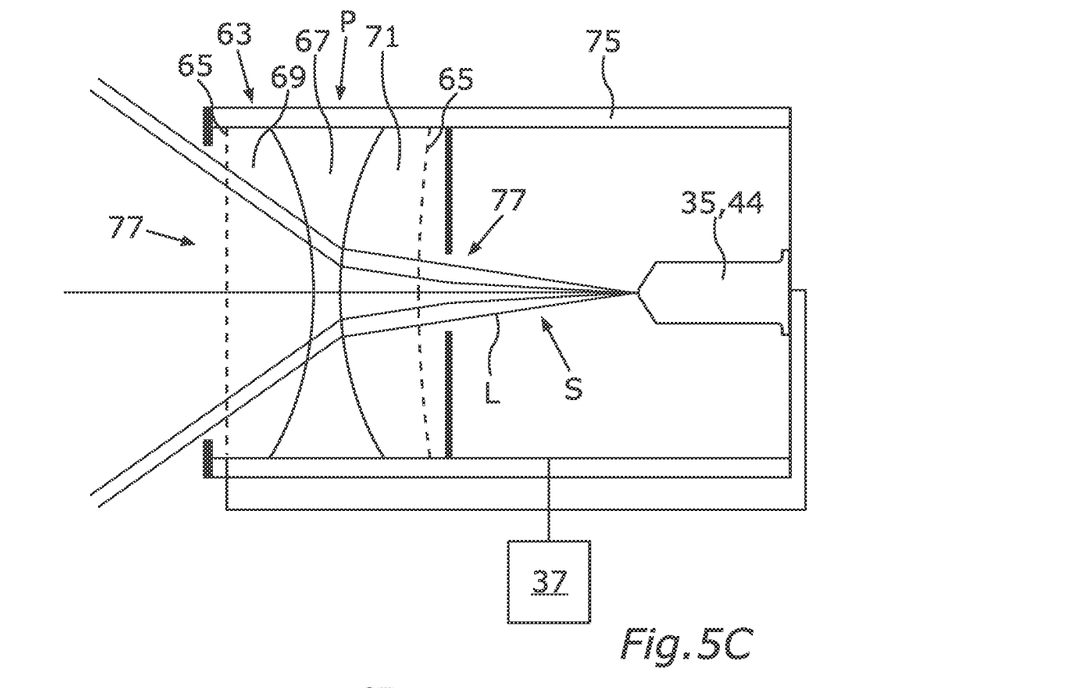

However, to be able to also variably change the beam characteristic S of the picture element 35, the lens membrane 67 can in particular be deformable by an electrical control of the polymer actuators 62. This is illustrated in FIG. 5B. Due to a deformation of the polymer actuators 65, the fluid of a respective one of the microfluid chambers 69 and 71 can in particular be selectively pressed against the lens membrane 67 in order thereby to adapt the shape F of the lens membrane 67. For example, the lens membrane 67 can thereby be deformed such that the expansion of the light beams 11 is reduced in comparison with the control or shape F shown in FIG. 5A. Provision can also be made that the lens membrane 67 can be deformed such that the lens 63 can act as a converging lens in order, for example, to be able to transmit a focused light beam L from the picture element 35. This can in particular be provided when the background display device 15 is configured to also illuminate the real subject 17 and, for example, to sectionally act as an illumination of the virtual image recording studio 13. Due to an appropriate focusing of the light beams L emitted by the picture elements 35 of such a section, a spotlight can thus in particular be directed, for example, onto the real subject 17. The control device 37 can thus in particular be configured to change a focal value, a focal length and/or a refractive power of the lenses 63 by controlling the lens arrangement 61.

Furthermore, the control device 37 can be configured to change the beam characteristic S of the picture element 35 in that the position P of the lens 63 is adapted by controlling the lens arrangement 61. For this purpose, it is illustrated by way of example in FIG. 5C that a spacing between the lens 63 or the lens membrane 67 and the picture element 35 or the light-emitting diode 44 can be changed by a telescopic movement of the lens frame 75. Such an extension of the lens 63 over the lens frame 75 can in particular be individually settable for each lens 63 of the lens arrangement 61 by controlling the lens arrangement 61 via the control device 37. However, provision can also be made that, for example, the lens membrane 67 is displaceable in the fluid chambers 69 and 71, in particular by controlling the polymer actuators 65, to be able to change and set the spacing between the lens membrane 67 and the picture element 35.

Figure 5D:
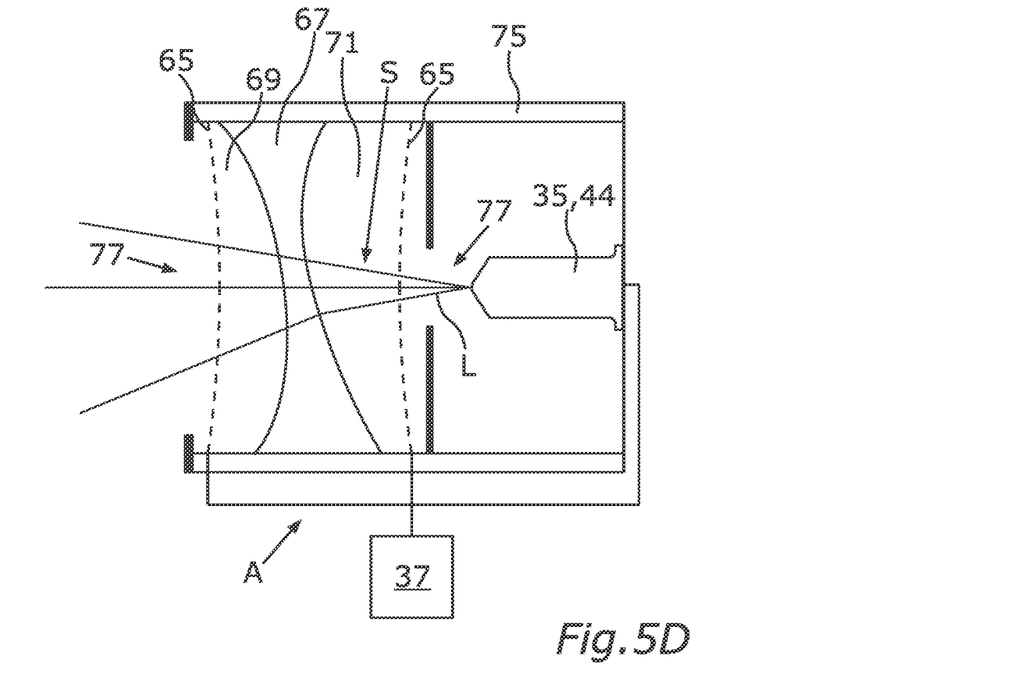

Furthermore, the control device 37 can be configured to change an orientation A of the lens 63 and/or of the lens membrane 67 in order to influence the beam characteristic S of the picture element 35. This is shown in FIG. 5D in which the lens membrane 67 is tilted with respect to an orientation in parallel with the openings 77 by appropriately controlling the polymer actuators 65. Due to such a tilting, the light beams L emitted by the picture element 35 can in particular be directed in order, for example, to be able to direct a spotlight onto a real subject 17 and in particular an actor. As an alternative to a tilting of the lens membrane 67, provision can also be made that the control device 37 is configured to tilt the lens 63 as a whole in the lens frame 75 in order thereby also to change the orientation of the lens membrane 67.

Such a lens arrangement 61 can thus in particular make it possible to adapt the beam characteristic S of the picture elements 35 of the background display device 15 and thereby to expand the design possibilities. Furthermore, a configuration of the lenses 63 as microlenses can make it possible to associate a respective lens 63 with each of the picture elements 35, and in particular with each light-emitting diode 44, said respective lens 63 being individually controllable to be able to individually adapt the beam characteristic S of each picture element 35. Furthermore, a control via the polymer actuators 65 can generate a direct change of the shape F, of the position P and/or of the orientation A of the lens membrane 67 so that the beam characteristic S of a respective associated picture element 35 can in particular be dynamically changeable during a recording by the associated camera 23.

REFERENCE NUMERAL LIST 1 image sensor
10 recording system
11 background display system
13 image recording studio
15 background display device
17 real subject, actor
19 representation
21 virtual background
23 camera
31 illumination apparatus
33 LED wall
35 picture element
36 picture element carrier
37 control device
39 memory 41 panel
43 three-dimensional scene
35 light-emitting diode
45 light-emitting diode unit
47 memory
49 display device
51 input device
53 camera body
59 camera lens, interchangeable lens
61 lens arrangement
63 lens
65 polymer actuator
67 lens membrane
69 microfluid chamber
71 microfluid chamber
73 lens array
75 lens frame
77 opening
79 viewfinder
81 lens ring
83 lens setting motor
85 lens ring drive unit
87 holding rod
91 first object
92 second object
93 third object
94 fourth object
97 readout circuit
99 signal output
101 interface
103 interface
A orientation
B image data set
F shape
L light beam
P position
S beam characteristic

The invention claimed is:

1. A background display device for a virtual image recording studio that is configured to display, behind a real subject, a representation of a virtual background for a camera recording, said background display device comprising
an active illumination apparatus that comprises at least one panel having a plurality of picture elements in an at least two-dimensional arrangement;
a control device; and
a controllable lens arrangement,
wherein the control device is configured to control the active illumination apparatus to display the representation of the virtual background,
wherein the control device is configured to change a beam characteristic of at least some of the plurality of picture elements by controlling the lens arrangement,
wherein the control device is configured to control the active illumination apparatus to change the displayed representation of the virtual background at an image refresh rate, and
wherein the control device is configured to control the lens arrangement in accordance with the image refresh rate.

2. A background display device in accordance with claim 1,
wherein the background display device is configured as an LED wall and the picture elements are configured as light-emitting diodes or light-emitting diode units.

3. A background display device in accordance with claim 1,
wherein the active illumination apparatus has a width of at least 5 meters and a height of at least 2 meters.

4. A background display device in accordance with claim 1,
wherein the control device is configured to at least one of:
controlling the picture elements of the at least one panel individually to display the representation of the virtual background; or
controlling the picture elements of the at least one panel in groups of adjacent picture elements to display the representation of the virtual background.

5. A background display device in accordance with claim 1,
wherein the lens arrangement comprises a plurality of lenses, wherein each lens is associated with at least one respective picture element.

6. A background display device in accordance with claim 5,
wherein each picture element is associated with a respective lens.

7. A background display device in accordance with claim 5,
wherein the control device is configured to individually control each of the plurality of lenses.

8. A background display device in accordance with claim 5,
wherein each of the plurality of lenses comprises an electrical polymer actuator.

9. A background display device in accordance with claim 8,
wherein the lenses have a respective lens membrane that can be deformed by controlling the polymer actuator.

10. A background display device in accordance with claim 5,
wherein a focal length of the lenses is settable.

11. A background display device in accordance with claim 5,
wherein the lenses are configured as diverging lenses.

12. A background display device in accordance with claim 5,
wherein the control device is configured to change at least one of a position or an orientation of the lenses.

13. A background display device in accordance with claim 1,
wherein the lens arrangement comprises at least one lens array that has a plurality of lenses connected to one another.

14. A background display device in accordance with claim 13,
wherein the lens array comprises a lens frame in which the plurality of lenses are held.

15. A background display device in accordance with claim 14,
wherein the lens frame is at least one of impermeable to light or has an anti-reflective coating.

16. A background display device in accordance with claim 13,
wherein the lenses of the lens array are connected to one another by a wafer bonding.

17. A method of displaying a representation of a virtual background by a background display device for a recording by a camera in a virtual image recording studio,
wherein the background display device has an active illumination apparatus, which comprises at least one panel having a plurality of picture elements in an at least two-dimensional arrangement, and a lens arrangement that comprises a respective individually controllable lens for each picture element of the plurality of picture elements, comprising the steps:
generating the representation of the virtual background;
controlling the picture elements to display the representation of the virtual background; and
controlling the lens arrangement to change a beam characteristic of the picture elements,
wherein the displayed representation of the virtual background is changed at an image refresh rate, and wherein the lens arrangement is controlled in accordance with the image refresh rate.

18. A method in accordance with claim 17, further comprising the step:
recording the representation of the virtual background using the camera.

* * * * *